(12) United States Patent
Ye et al.

(10) Patent No.: US 7,483,085 B2
(45) Date of Patent: Jan. 27, 2009

(54) DIGITAL IMPLEMENTATION OF ANALOG TV RECEIVER

(75) Inventors: Hua Ye, Durham, NC (US); Daniel Iancu, Pleasantville, NY (US); John Glossner, Carmel, NY (US); Vladimir Kotlyar, Stamford, CT (US); Andrei Iancu, Pleasantville, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 599 days.

(21) Appl. No.: 11/177,356

(22) Filed: Jul. 11, 2005

(65) Prior Publication Data

US 2007/0008434 A1 Jan. 11, 2007

(51) Int. Cl.
*H04N 5/455* (2006.01)
(52) U.S. Cl. ............... 348/727; 348/728; 348/530; 348/531
(58) Field of Classification Search ................ 348/727, 348/663–670, 571, 575, 545, 540, 728, 525–531
See application file for complete search history.

(56) References Cited

U.S. PATENT DOCUMENTS

| | | | | |
|---|---|---|---|---|
| 4,466,015 A | * | 8/1984 | Wargo et al. | ........... 348/646 |
| 4,580,165 A | | 4/1986 | Patton et al. | |
| 4,600,937 A | | 7/1986 | Kudo et al. | |
| 4,689,664 A | * | 8/1987 | Moring et al. | ........... 348/639 |
| 5,844,622 A | | 12/1998 | Hulvey et al. | |
| 5,978,038 A | | 11/1999 | Ito et al. | |
| 6,147,713 A | | 11/2000 | Robbins et al. | |
| 6,441,860 B1 | * | 8/2002 | Yamaguchi et al. | ........... 348/555 |
| 6,486,919 B1 | | 11/2002 | Kim | |

FOREIGN PATENT DOCUMENTS

| | | |
|---|---|---|
| EP | 529 442 | 3/1993 |
| EP | 794 633 | 9/1997 |

OTHER PUBLICATIONS

Harris, Fred, "Digital Signal Processing in Radio Receivers and Transmitters," *International Journal of Wireless Communication* 5:2, 1998, pp. 133-145 (Abstract).

* cited by examiner

*Primary Examiner*—M. Lee
(74) *Attorney, Agent, or Firm*—Barnes & Thornburg LLP

(57) ABSTRACT

An analog TV receiver implementation on DSP allows mobile platforms to view analog TV broadcasting on LCD displays. The analog television receiver includes a demodulator for demodulating a received analog television signal, an analog to digital converter for digitizing the demodulated television signal and a digital signal processor for producing display signals from the digitized television signals. The digital signal processor being programmed to search for a horizontal synchronization signal in the television signal, track the horizontal synchronization signal and search for a vertical synchronization signal in the television signal. Next the processor separates a luminance and a pair of chrominance components of the television signal and demodulates the pair of chrominance components. Red, green and blue values are constructed from the demodulated chrominance components and the luminance components. Display signals are produced from the red, green and blue values.

14 Claims, 4 Drawing Sheets

US 7,483,085 B2

DIGITAL IMPLEMENTATION OF ANALOG TV RECEIVER

BACKGROUND AND SUMMARY OF THE DISCLOSURE

The present invention relates generally to communication receivers and, more specifically, to digital signal processing of analog TV signals in receivers.

There is a demand to provide mobile platforms with the capabilities of viewing TV broadcasting. Although digital TV and HDTV are starting to be deployed, the analog TV broadcasting (NTSC, PAL, etc) has been and is still the most widely available all over the world. Traditionally the analog TV receivers use all analog circuits. For mobile platforms, there is normally a digital signal processor DSP chip available that can be used for different functions such as 3G mobile phone, AM/FM receivers, digital TV receiving, wireless LAN/MAN, etc. The same DSP can also be used to perform the task of analog TV receiving.

The present disclosure is a novel implementation of analog TV receiver on DSP that can allow mobile platforms to view analog TV broadcasting on LCD displays.

The analog television receiver includes a demodulator for demodulating a received analog television signal, an analog to digital converter for digitizing the demodulated television signal and a digital signal processor for producing display signals from the digitized television signals. The digital signal processor being programmed to search for a horizontal synchronization signal in the television signal, track the horizontal synchronization signal and search for a vertical synchronization signal in the television signal. Next the processor separates a luminance and a pair of chrominance components of the television signal and demodulates the pair of chrominance components. Red, green and blue values are constructed from the demodulated chrominance components and the luminance components. Display signals are produced from the red, green and blue values.

The vertical synchronization signal is maintained by using the tracked horizontal synchronization signal. The horizontal synchronization signal may be continuously tracked at least after vertical synchronization has been obtained. The horizontal synchronization signal tracking may include determining an average timing offset and tracking the changes from the average timing offset. The horizontal synchronization signal tracking may be performed by a delay locked loop (DLL). The receiver horizontal synchronization signal tracking should persist for about twenty lines to be valid.

The processor determines scaling gain and DC level from and adjusts the television signals. The phase of the chrominance components are determined and are used in the demodulation of the chrominance components. The phase of the chrominance components may be determined from the color burst as ChromaPhase($k$)=a tan 2(color_burst_sample($k$), color_burst_sample($k$+1))

These and other aspects of the present disclosure will become apparent from the following detailed description of the disclosure, when considered in conjunction with accompanying drawings.

DETAILED DESCRIPTION OF THE DRAWINGS

Figure 1:
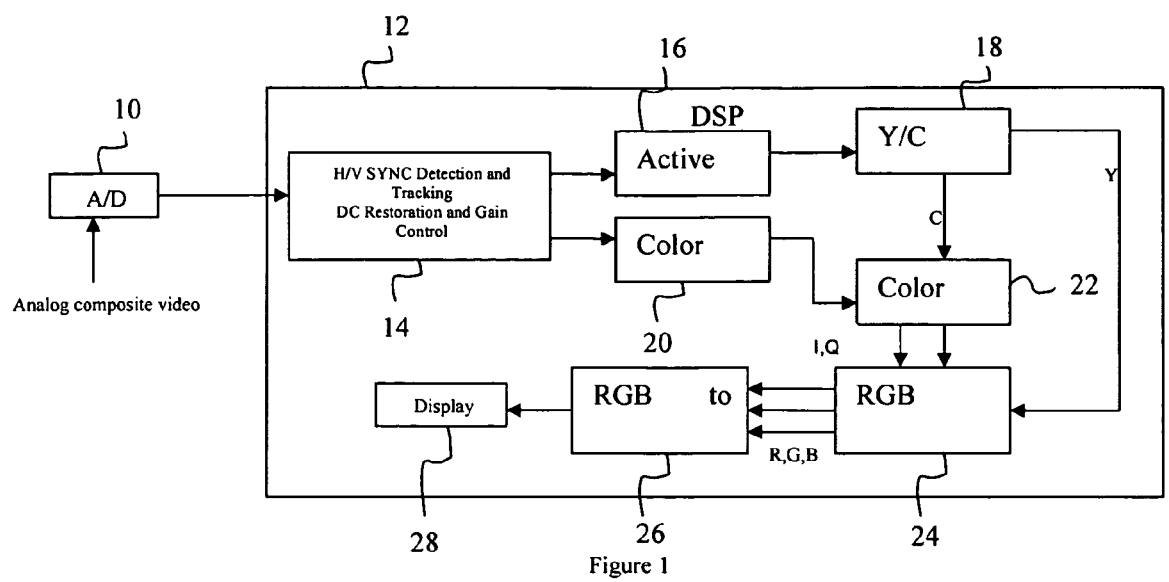
FIG. 1 is a block diagram of a receiver incorporating a DSP for analog TV of the present disclosure.

FIG. 1 shows the system block diagram of an analog TV receiver implemented on a DSP. The received analog TV signal is first demodulated, and then the demodulated analog TV baseband composite signal is digitized by an A/D converter 10 to feed into a DSP 12. All the remaining processing is implemented digitally. First the horizontal synchronization and vertical synchronization sequences are detected and tracked at 14; the input video composite signal is also adjusted to achieve proper DC level and scaling at 14. Then the active video signal is extracted line by line at 16 and luminescence and chrominance components Y/C are separated at 18. Color phase is extracted at 20 used for color demodulation of the chrominance component pair I, Q at 22. The components Y, I, Q are used to reconstruct the transmitted RGB signals at 24. Finally the RGB signal for the current video frame is converted to pixels at 26 and displayed on the LCD screen 28.

Figure 2:
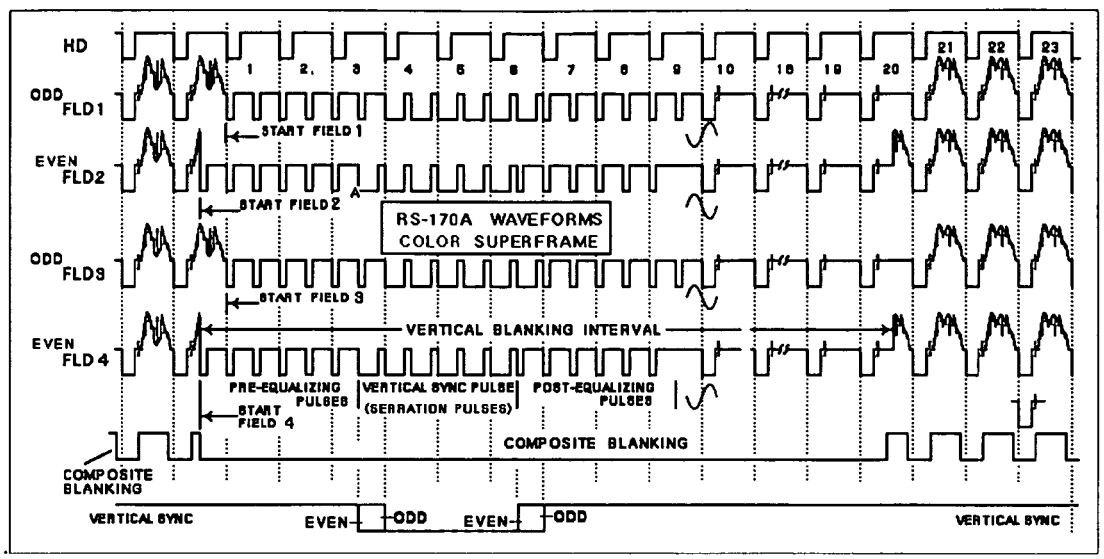
FIG. 2 are graphs of a color field blanking sequence for NTSC systems.
Figure 3:
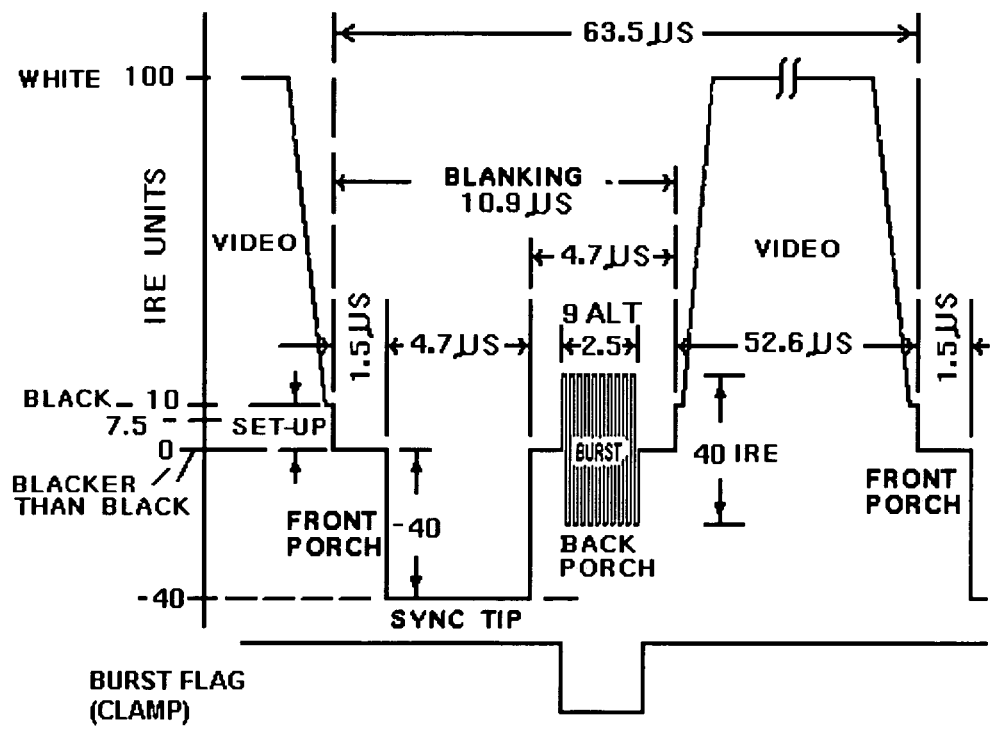
FIG. 3 are graphs of a horizontal synchronization complex.

In this disclosure, the NTSC video broadcasting standard is used as an example for describing how the TV receiver algorithms should be implemented. The algorithms are easily applicable to other analog TV standards such as PAL, SECAM, etc. In NTSC systems, each video frame consists of 525 lines, as shown in FIG. 2, the lines are illustrated as vertical columns. Lines 1~20 are the field-blanking period (color field FLD 1) that includes the vertical synchronization pulses for indicating to the receiver the start of a new video frame. The color field FLD 2 starts from the middle of line 263, indicating the middle of the video frame. The rest of the lines carry the actual video signal as shown in FIG. 3. Each line starts with a horizontal sync pulse followed by the back porch that carries the color burst used to extract the phase and frequency information for decoding the chrominance signal. The actual video signal for the line comes next.

As shown in FIGS. 2 and 3, the horizontal synchronization pulse is much easier and less MIP intensive to detect than vertical synchronization sequences. Once horizontal synchronization pulse is detected and line synchronization is achieved, it becomes almost trivial to locate vertical synchronization sequence to achieve video frame synchronization as will be disclosed in detail in the following. Since the horizontal synchronization pulse appears periodically for almost every line except during vertical synchronization intervals, the periodic horizontal synchronization pulses can be used to design a delay locked loop DLL type of tracking loop for tracking any frequency offset that may exist between the transmitter and receiver. In the preferred embodiment, the receiver will go through a startup process to achieve horizontal synchronization first, vertical synchronization next, and then video extraction and processing can be started.

Figure 4:
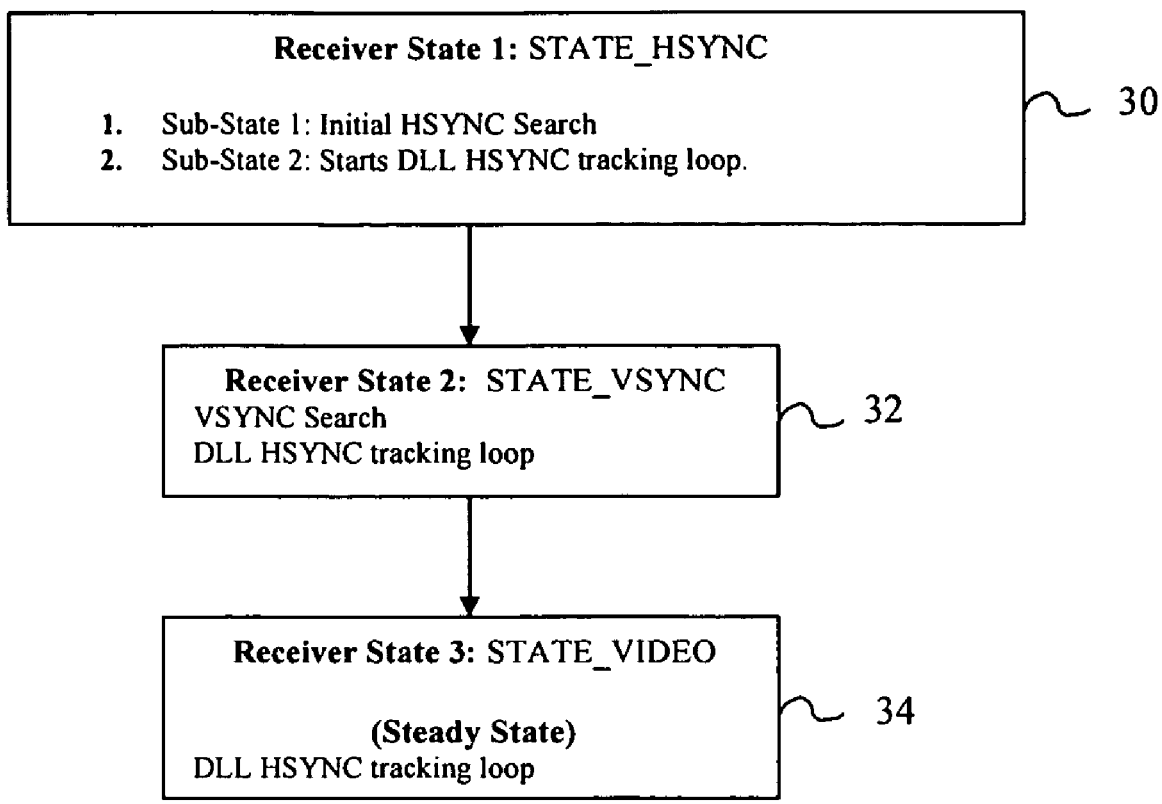
FIG. 4 is a state machine flow chart for NTSC implementation of the present disclosure.

FIG. 4 shows the NTSC receiver state machine flow chart. The receiver runs through a startup process to achieve vertical and horizontal synchronization.

In Receiver State 1: STATE_HSYNC at 30, the receiver goes through two sub-states to achieve horizontal synchronization (HSYNC) and start a DLL tracking loop for tracking the frequency offset between the transmitter and receiver. Sub-State 1: Initial HSYNC Detection state performs initial blind search for HSYNC. This is a full search process. The HSYNC match is performed sample by sample in a receiver buffer rx_in[ ]. rx_in[ ] buffer holds a little over one line worth of input A/D samples. At the end of a time period (the length of a line), a HSYNC location is declared to be found, the rx_in[ ] buffer pointer is adjusted to drag the HSYNC to start at location rx_in[2]. The HSYNC match can be done using the following equation:

$$HSYNCMatch(i) = -\sum_{k=0}^{N} rx\_in(k+i)$$

Where N=ceil(M*Fs), M is the nominal time interval for the HSYNC pulse, Fs is the sampling rate for the receiver. The sample by sample search for HSYNC range runs from i=0, 1 ... (LineLength−1), where LineLength is the number of samples for the nominal line length duration.

The HSYNC position is found at sampling position k, where

HSYNCMax=HSYNCMatch($k$)=max(HSYNCMatch ($i$)), for $i$=0,1 ... (LineLength−1)

The HSYNC moving average above consumes a lot of DSP cycles. From the implementation point of view, one may spread the moving average over N lines as follows: For the first line, it only performs the moving average for the first 1/N samples, for the second line, it will generate the moving average for the second 1/N samples, so on. This is possible since the HSYNC occurs on every line. The moving average spreading over N lines can also be used for the HSYNC DLL tracking loop that we will disclose later.

Sub-State 2: HSYNC Tracking: Once in this state, the HSYNC has to be continuously found for over 20 lines around the initially detected HSYNC location, which is now at k=2±2 as follows:

HSYNCMatch($k$)≧0.9×HSYNCMax, $k$=0,1,2,3,4

If the above condition is not met, the detected HSYNC is declared to be false, and a fall back logic is activated to allow the receiver to fall back to the initial HSYNC detection sub-state. The fall back logic is designed to handle the special situation where the receiver happens to start the HSYNC detection during vertical synchronization periods. Starting from this state, a DLL logic is enabled to track the movement of the HSYNC location due to frequency offset between the transmitter and receiver. The DLL search range is 2 samples left and 2 samples right of the current HSYNC starting position at k=2 as expressed in the above equation. The maximum of the HSYNC match results for k=0,1,2,3,4 is found and the receiver buffer pointer is manipulated so that the maximum HSYNC match position will be adjusted to k=2. So the task of the DLL tracking loop is to skip or repeat up to 2 samples for each video line to track the frequency offset that exists between the transmitter and receiver. The DLL tracking loop should be on all the time starting from this state except during the vertical synchronization period, where the DLL tracking loop is disabled.

In this sub-state, the receiver can also run an estimate of an average timing offset in samples so that this average offset can be taken care of with pointer manipulation, this is meant to handle any constant frequency offset between the transmitter and receiver so that the DLL is only used to track any dynamic timing drifts. The average timing offset estimation can be estimated as follows:

$$ave\_offset = round\left(\frac{\sum_{i=0}^{19}(n_i - 2)}{20}\right)$$

Where $n_i$ is the sampling position for max(HSYNCMatch ($k$)),k=0,1,2,3,4, for line i.

In Receiver State 2 STATE_VSYNC at 32, the receiver has achieve line synchronization, HSYNC/DLL tracking runs continuously to keep the line synchronization and track any remaining dynamic frequency offset. The main task of this state is vertical synchronization pattern search (VSYNC) to achieve video frame synchronization. Since in this state, the receiver has achieved horizontal synchronization, it knows the line start sampling position. VSYNC detection becomes quite trivial. The VSYNC pattern is searched for as displayed by VSYNC pulses in line 4, 5 and 6 as shown in FIG. 2. One can see that VSYNC patterns for line 4, 5 and 6 are exactly the same. For VSYNC match, one does not need to store all 3 lines of signal, instead, one can perform partial match separately for each line, and then a summation of the partially matched results for the current line and the previous 2 lines will give the final match result for 3 lines. The following equation shows how the partial VSYNC match can be done:

$$VSYNCMatch(i) = -\sum_{k=2}^{1+N_L} rx\_in(k) +$$

$$\sum_{k=2+N_L}^{1+N_H+N_L} rx\_in(k) - \sum_{k=2+N_H+N_L}^{1+N_H+2*N_L} rx\_in(k) + \sum_{k=2+N_H+2*N_L}^{1+2*N_H+2*N_L} rx\_in(k)$$

Where $N_L$=ceil($M_L$*Fs), $M_L$ is the nominal time interval for the VSYNC low pulses in line 4, 5 and 6, $N_H$=ceil($M_H$*Fs), $M_H$ is the nominal time interval for the VSYNC high pulses in line 4, 5 and 6.

The VSYNC match is performed for a duration of one video frame, the maximum matched result can be found as follows:

$$\max\left[\sum_{i=0}^{2} VSYNCMatch(i)\right]$$

The line count that runs from 0 to 524 can be set accordingly to achieve vertical (frame) synchronization. Once VSYNC is achieved, the receiver can keep the line count and since HSYNC is tracked continuously, vertical synchronization will be kept automatically. The receiver will stay in this state until the line count reaches 0 indicating that a new video frame is starting. At this point, the receiver can transition to the next state to start video frame processing.

In this state, the VSYNC high and low pulse levels are measured. The measured levels can used to adjust the received A/D composite signal to be at the right IRE levels as shown in FIG. 3. This adjustment is necessary since the video composite signal from the A/D is normally AC coupled, but video signal is inherently a DC signal. The VSYNC and HSYNC pulse levels, blanking levels and reference white levels all need to be adjusted to the correct IRE levels as shown in FIG. 3. Assume that the measured low pulse level for VSYNC is VSYNCLow, the measured blanking level for VSYNC is BlankLevel, the DC level and scaling factor can be calculated as follows:

$$ScalingGain = \frac{40}{BlankLevel - VSYNCLow}$$
$$DCLevel = -ScalingGain * BlankLevel$$

The video composite input from A/D is adjusted by ScalingGain and DCLevel as below:

ScalingGain*(A/D_Input_sample)+DCLevel

After the DC level and gain adjustment, the video composite signal samples will be at the proper IRE levels as shown in FIG. 3.

In Receiver State 3 STATE_VIDEO at 34, the receiver is in a steady state. It continues HSYNC/DLL tracking to keep synchronization with the transmitter in the presence of frequency offset. Video data extraction and processing for reconstruction of RGB signals are performed per video line. There are 484 displayable video lines for each video frame.

Figure 5:
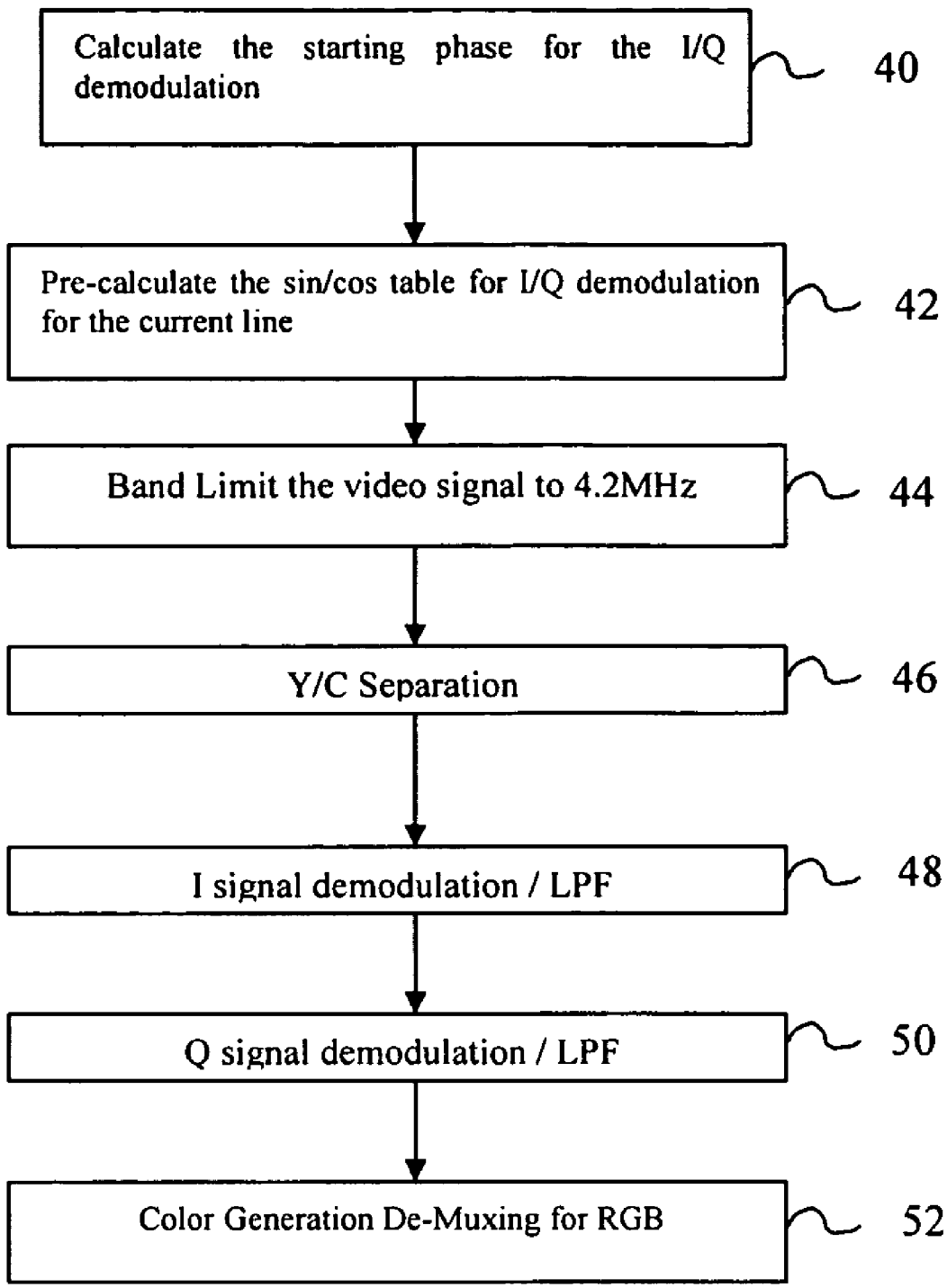
FIG. 5 is a code flow chart for video process per line according to the present disclosure.

FIG. 5 shows the code flow chart for video processing per line. The starting phase for the I/Q demodulation is calculated at 40. The sin/cos table for I/Q demodulation for the current line is calculated at 42. The video signal is band limited to, for example 4.2 MHz. at 44. The Y/C separation is performed at 46. The I and Q demodulation and low pass filtering is performed at 48 and 50. Finally, color generation de-multiplexing for red, green and blue is conducted.

For each displayable video line, first, the receiver needs to extract the color burst to reconstruct the I/Q demodulation phase and chrominance frequency. Since in this design, the receiver keeps line synchronization by the HSYNC DLL tracking loop, one can safely assume the demodulation frequency to be the nominal chrominance carrier frequency. Two different algorithms for extracting the chrominance phase will be discussed. The first algorithm is based on extracting the chrominance phase in time domain while the second algorithm is based on extracting the chrominance phase in frequency domain.

To make the estimation of the chrominance phase easier in the time domain, the sampling rate Fs is set to be four times of the chrominance carrier frequency: $Fs=4*f_{sc}$. Thus there are 4 samples per each color burst cycle and the phase change between the adjacent color burst samples is exactly 90 degree. The time domain algorithm simply take any one color burst sample at time k as sin(k), the next color burst sample at time k+1 will become cos(k). The receiver can calculate the chrominance phase at sampling position k by the following equation:

ChromaPhase(k)=a tan 2(sin(k), cos(k))=a tan 2 (color_burst_sample(k), color_burst_sample(k+1) sample(k+1)

The ChromaPhase(k) calculated in this way has to choose the sampling position k to be around the middle of the color burst sequence to be accurate.

The above time domain algorithm is extremely simple to implement, a limitation of the algorithm is that the chrominance phase estimated directly from the time domain samples will be sensitive to the noise disturbance in the color burst.

The second algorithm extract chrominance phase from frequency domain. First, N=24 samples x(0),x(1) ... x(N−1) which are located in the middle of the color burst are extracted. A Fourier Series is generated for frequency domain index k=N/4=6 as follows:

$$X(k) = \sum_{n=0}^{N-1} x(n)e^{-j2\pi kn/N}, k = 6$$

The chrominance phase can then be estimated from the Fourier Series:

ChromaPhase(k)=a tan 2(imag(X(6),real(X(6))

The chrominance phase estimated from frequency domain is much more robust to noise disturbance than the chrominance phase estimated from the time domain due to the averaging (smoothing) effect of the Fourier Series.

The I/Q demodulation phase is then set to the following as recommended in ITU-R BT.470-4 "Television Systems":

De mod Phase(k)=ChromaPhase(k)+180°+33°

A sin table can then be pre-calculated starting from De mod Phase(k). For the sin table generation, once the first 2 samples are generated:

sin(Demod Phase(k)) and sin(Demod Phase(k)+90°)

Invert the above 2 samples will generate the next two samples in the sin table. The generated four sin samples can be repeated to fill the whole sin table that can be used for chrominance demodulation for Q channel. For chrominance demodulation of I channel, a cos table is normally needed. However, due to the 90 degree phase change relationship between any 2 samples, the following equation holds: cos(k)= sin(k+1) This means that the cos table can share the same sin table by advancing the pointer by 1.

The above approach of generating the sin table requires one atan2 and two sin calculations per video line. There is another approach that will do further simplification to remove the atan2 and sin calculations.

The equation De mod Phase(k)=ChromaPhase(k)+180°+ 33° is rewritten as:

De mod Phase(k)=ChromaPhase(k)+delta_phase1

The first two sin samples in the sin table that needs to be calculated are:

$$\begin{aligned}
\sin(DemodPhase(k)) &= \sin(ChromaPhase(k) + \text{delta\_phase1}) \\
&= \sin(ChromaPhase(k)) * \cos(\text{delta\_phase1}) + \\
&\quad \cos(ChromaPhase(k)) * \sin(\text{delta\_phase1}) \\
&= \frac{\text{color\_burst\_sample}(k)}{20IRE} * \cos(\text{delta\_phase1}) + \\
&\quad \frac{\text{color\_burst\_sample}(k+1)}{20IRE} * \\
&\quad \sin(\text{delta\_phase1})
\end{aligned}$$

and

-continued $$\begin{aligned}\sin(DemodPhase(k)+90°) &= \sin(ChromaPhase(k)+\text{delta\_phase2}) \\ &= \frac{\text{color\_burst\_sample}(k)}{20IRE} * \\ & \quad \cos(\text{delta\_phase2}) + \\ & \quad \frac{\text{color\_burst\_sample}(k+1)}{20IRE} * \\ & \quad \sin(\text{delta\_phase2})\end{aligned}$$

Thus, the atan2 and sin calculations need not performed using the second approach. Instead, the first 2 sin samples can be directly calculated by doing only multiplication/addition of color_burst_sample(k) and color_burst_sample(k+1). Since delta_phase1/delta_phase2 are fixed, their sin values can be pre-calculated. Note, that the color burst samples need to be properly scaled due to the IRE levels. If by any chance, the TV transmitter is not obeying the standard (i.e., the color burst is not sent at 20IRE scaling as specified), then there will be trouble. While the first approach does atan2 to get the phase, so it doesn't care about the in-accurate scaling of the color burst.

In summary, an implementation of analog TV receivers on mobile platforms using DSPs is disclosed. This includes a receiver startup process; the algorithms for achieve horizontal and vertical synchronization; the DLL loop for tracking frequency offset between the transmitter and receiver and the algorithms for recovering chrominance demodulation phase from the color burst.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. An analog television receiver comprising a demodulator for demodulating a received analog television signal and producing a demodulated television signal, an analog to digital converter for processing the demodulated television signal and digitizing the demodulated television signal, thereby producing a digitized television signal, and a digital signal processor for processing the digitized television signal and producing display signals from the digitized television signal, the digital signal processor being programmed to:
search for a horizontal synchronization signal in the television signal;
track the horizontal synchronization signal using a delay locked loop;
search for a vertical synchronization signal in the digitized television signal using the horizontal synchronization signal;
separate a luminance and a pair of chrominance components of the digitized television signal;
demodulate the pair of chrominance components;
construct red, green and blue values from the demodulated chrominance components and the luminance components; and
produce display signals from the red, green and blue values.

2. The receiver according to claim 1, wherein the vertical synchronization signal is maintained by using the tracked horizontal synchronization signal.

3. The receiver according to claim 1, wherein the horizontal synchronization signal is continuously tracked at least after horizontal synchronization has been obtained.

4. The receiver according to claim 1, wherein the horizontal synchronization signal tracking includes determining an average timing offset and using the average timing offset to track changes from the average timing offset via the delay locked loop.

5. The receiver according to claim 1, wherein the delay locked loop is disabled during a vertical synchronization period.

6. The receiver according to claim 1, wherein the horizontal synchronization signal tracking must persist for about twenty lines to be valid.

7. The receiver according to claim 1, wherein the program determines scaling gain as a function of a low pulse level and a blanking level of the vertical synchronization signal, determines DC level as a function of the scaling gain and the blanking level of the vertical synchronization signal, and adjusts the television signals as a function of the scaling gain and the DC level.

8. The receiver according to claim 1, wherein the program determines a phase of the chrominance components which are used in the demodulation of the chrominance components.

9. The receiver according to claim 1, wherein the program determines the phase of the chrominance components from a color burst as ChromaPhase($k$)=a tan 2(color_burst_sample($k$), color_burst_sample($k$+1)).

10. The receiver according to claim 1, wherein the receiver is a mobile communication device with a display.

11. The receiver according to claim 1, wherein the horizontal synchronization signal search includes computing a moving average over a line length and using the moving average to determine a horizontal synchronization match.

12. The receiver according to claim 11, wherein the moving average is spread over N lines with 1/Nth of each line moving 1/N samples per line being used for the average.

13. The receiver according to claim 1, wherein the vertical synchronization signal search includes performing a partial match over at least three lines, and summing the partial matches to determine a vertical synchronization match.

14. The receiver according to claim 1, wherein the program determines the phase of the chrominance components from a color burst as ChromaPhase($k$)=a tan 2(imag($X$(6)),real($X$(6))).

* * * * *